3,725,191
FOAM LAMINATES
Martin S. Bloom, Stockton-on-Tees, England, assignor to Imperial Chemical Industries Limited, London, England
No Drawing. Filed Sept. 20, 1971, Ser. No. 182,146
Claims priority, application Great Britain, Oct. 2, 1970, 47,035/70
Int. Cl. B32b 3/26; C09j 7/02
U.S. Cl. 161—160                     12 Claims

ABSTRACT OF THE DISCLOSURE

A foam laminate comprising a rigid layer of a foamed synthetic plastics material confined between two skins wherein the outer face of at least one of the skins is provided with a decorative coating comprising a polymeric material and antimony powder, the exposed face of the decorative coating having laminated thereto a strippable protective film of a synthetic plastics material.

---

The present invention relates to foam laminates of the kind comprising a rigid layer of a foamed synthetic plastics material confined between two skins. Foam laminates of the kind described are useful as light-weight building panels, and various processes and materials for their manufacture have been proposed, for example in prior British Pats. Nos. 997,086, 1,098,472, 1,098,473, 1,113,959, 1,127,600, 1,136,046 and British Pats. Nos. 1,023,164, 1,053,192 (which correspond, respectively, to U.S. Pats. Nos. 3,369,065 and 3,537,929).

A non-comprehensive list of suitable foamed synthetic plastics materials includes foams made from polyurethane, polystyrene, polyvinyl chloride, polyethylene, urea formaldehyde, phenol formaldehyde and epoxy resins. A non-comprehensive list of suitable skins (which may be the same or different for any one laminate) includes paper, paper-board, cardboard; metal sheets or foils; asbestos paper or sheets; rubber, synthetic plastics films such as polyethylene, polypropylene, polyethylene terephthalate, polyvinyl chloride, polyvinylidene chloride, fiberglass, melamine formaldehyde, urea formaldehyde, phenol formaldehyde, polystyrene, nitrocellulose; textiles, particularly densely woven cloth; wood, plywood, plasterboard, asbestos cement sheets, hardboard, fiberboard.

In foam laminates of the kind described, at least one of the skins may itself be of laminated construction, for example comprising at least two sheets (which may be the same or different) bonded together by an adhesive. A typical such laminated construction is a paper/polyethylene/aluminum-foil laminate (in which the polyethylene acts as an adhesive).

It is frequently required that in a foam laminate of the kind described, the outer face of at least one of the skins be provided with a decorative coating, and a coating (preferably pigmented) of a solution or emulsion (for example, a printing ink) of a polymeric material is very suitable for this purpose. One such decorative coating is obtained by pre-coating the outer face of the skin or skins (prior to the foam-laminating step) with a pigmented emulsion of acrylic/polyvinylidene chloride copolymer; by way of example, this coating may be applied by an air-knife coating technique and at a coating weight of the order of 14 gms./sq. meter. Other suitable coatings include acrylic polymers and copolymers in general, and acrylic, PVC-, and chlorinated rubber-printing inks.

However, during the subsequent foam-laminating steps, handling, storage, delivery to and use on the building site, the decorative coating inevitably becomes soiled, and it would be a very real advantage to be able to provide it, throughout this time, with a protective cover which could be easily stripped off immediately before the foam laminate is used (or even after it has been erected at the building site). We attempted to provide such a protective cover for the decorative coatings referred to in the preceding paragraph by coating them with polyethylene film (applied by a hot extrusion coating process), but found that the polyethylene film adhered so strongly to the decorative coating that it was impossible to strip it off.

At about the same time, in order to ensure that the decorative coatings of our foam laminates would have a very low flame spread, we added antimony trioxide powder to the coating solution or emulsion to obtain an intimate mixture. Now, when we coated the decorative coatings with polyethylene film by a hot extrusion coating process (as in the immediately preceding paragraph), we found that the polyethylene film could be stripped off very cleanly and very easily. We found it most surprising that, considering how strongly the film had previously adhered to the decorative coating, it could be stripped off so satisfactorily if the decorative coating contained antimony trioxide powder in intimate admixture therewith. Without committing ourselves to a specific explanation for this phenomenon, we believe that, in spite of the decorative coating's apparently very smooth and uniform surface, it contains a large number of microscopic particles of antimony trioxide separated by and projecting above numerous small patches of the polymeric coating, that the polyethylene film wets, and does not adhere to, the antimony trioxide particles, and therefore partially adheres only to the numerous small patches of polymeric coating, so that it can be stripped from the decorative coating very much more easily than if the latter presented a completely flat and continuous surface unbroken by the antimony trioxide particles.

The present invention accordingly provides a foam laminate of the kind described wherein the outer face of at least one of the skins is provided with a decorative coating comprising a polymeric material and antimony trioxide powder, the exposed face of the decorative coating having laminated thereto a strippable protective film of a synthetic plastics material.

The preferred foam is foamed polyurethane. The polymeric material is preferably applied to the outer face of the skin (or skins) as a pigmented solution or emulsion containing the antimony trioxide powder. The synthetic plastics film is conveniently polyethylene or polypropylene and is preferably laminated to the decorative coating by a hot extrusion or roller coating process.

As indicated above, the skin (or each skin) is provided with its decorative coating and protective film before being fed to the foam-laminating step. The present invention has an additional advantage in that, before we were able to laminate the strippable synthetic plastics film to the decorative coating, we found that the antimony trioxide in the latter increased friction in the laminating machinery, causing considerable vibration and abrasion therein, which disappeared as soon as we were able to provide the protective strippable synthetic plastics film.

The skin (or skins) may (apart from the decorative coating and strippable protective synthetic plastics film) be selected from a wide variety of materials, many of which are disclosed above and in the above-mentioned prior patents. In one preferred embodiment, the skin (or each skin) may be a laminate consisting of the following layers in the following order (commencing with its inner face—i.e. the face thereof which is to be adjacent the foam):

(a) Polyethylene; preferably subjected to corona discharge or other oxidising treatment; preferably at least 0.001" thick to ensure freedom from pinholes; preferably with matt finish.

(b) Kraft liner board; for example about 42 lb./1000 sq. ft. (205 gms./sq. meter); coated with (a).

(c) Polyethylene (as a bonding agent); as little as will give good adhesion between (b) and (d) hereunder.

(d) Aluminium foil; for example between about 0.0010" and 0.0080" thick, preferably about 0.0016 in. thick (0.040 mm.).

(e) A decorative coating containing antimony trioxide powder; for example an acrylic polymer or co-polymer, preferably applied to (d) as a solution or emulsion containing the antimony trioxide and a pigment, by an air-knife coating technique.

(f) A protective strippable polyethylene film coating; preferably applied to the decorative coating (e) by hot extrusion or roller coating.

I claim:

1. A foam laminate comprising a rigid layer of a foamed synthetic plastics material confined between two skins, wherein the outer face of at least one of the skins is provided with a decorative coating comprising a polymeric material and antimony trioxide powder, the exposed face of the decorative coating having laminated thereto a strippable protective film of a synthetic plastics material.

2. A foam laminate as claimed in claim 1, wherein said polymeric material is an acrylic polymer.

3. A foam laminate as claimed in claim 1, wherein said polymeric material is an acrylic copolymer.

4. A foam laminate as claimed in claim 3, wherein said polymeric material is an acrylic/polyvinylidene copolymer.

5. A foam laminate as claimed in claim 1, wherein the polymeric material is pigmented.

6. A foam laminate as claimed in claim 1, wherein the polymeric material is a printing ink.

7. A foam laminate as claimed in claim 6, wherein the printing ink is an acrylic printing ink.

8. A foam laminate as claimed in claim 6, wherein the printing ink is a polyvinyl chloride printing ink.

9. A foam laminate as claimed in claim 6, wherein the printing ink is a chlorinated-rubber printing ink.

10. A foam laminate as claimed in claim 11, wherein the polymeric material and the antimony trioxide powder are in intimate admixture.

11. A foam laminate as claimed in claim 1, wherein the strippable protective synthetic plastics film is a polyethylene film.

12. A foam laminate as claimed in claim 1, wherein the strippable protective synthetic plastics film is a polypropylene film.

References Cited
UNITED STATES PATENTS

| | | | |
|---|---|---|---|
| 3,502,539 | 3/1970 | MacPhail, Sr. | 161—161 |
| 3,553,132 | 1/1971 | Dunay et al. | 161—403 |
| 3,554,835 | 1/1971 | Morgan | 161—406 |
| 3,686,067 | 8/1972 | Williams | 161—160 |
| 3,694,305 | 9/1972 | Munawwar | 161—403 |

WILLIAM J. VAN BALEN, Primary Examiner

U.S. Cl. X.R.

161—161, 162, 164, 167, 406, 413